United States Patent Office 3,089,809
Patented May 14, 1963

3,089,809
ANTIMICROBIAL THIO PYRIDAZINE COMPOSITIONS FOR AGRICULTURAL USE
Jiro Kinugawa, Osaka, Hiroichi Yamamoto, Kobe, Michihiko Ochiai, Suita, and Ikuo Sumina, Kyoto, Japan, assignors to Takeda Pharmaceutical Industries, Ltd., Osaka, Japan
No Drawing. Filed May 25, 1960, Ser. No. 31,512
Claims priority, application Japan May 30, 1959
11 Claims. (Cl. 167—33)

The present invention relates to valuable and novel antimicrobial compositions and to their use in agriculture, especially in combating fungi and bacteria which cause, for example, rice blast, rice bacterial leaf blight, cucumber anthracnose, pear black spot, etc., in plants of various kinds.

The antimicrobial compositions of the present invention are characterized by absence of phytotoxicity and by the fact that they contain, as antimicrobial ingredient, at least one compound of the formula

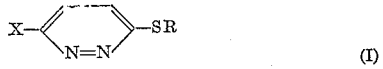

(I)

wherein X is a halogen, and R is hydrogen, cyano group or —COOR', where R' is an alkyl, benzyl or phenyl group.

The compounds (I) can conveniently be prepared as follows:

(a) 3-halo-6-mercaptopyridazine is preparable after the method reported by J. Druey et al. [Helv. Chim. Acta, vol. 37, p. 121 (1954)] and by N. Takabayashi [Journal of the Pharmaceutical Society of Japan, vol. 75, p. 778 (1955)]. Into an organic solvent such as an alcohol or an aliphatic ketone is introduced hydrogen sulfide in the presence of a base such as an alkali metal hydroxide, and to the solution is added 3,6-dihalopyridazine, and then the mixture is refluxed for a few hours, whereupon the corresponding 3-halo-6-mercaptopyridazine is produced.

(b) The compounds (I) except 3-halo-6-mercaptopyridazine can be prepared by allowing 3-halo-6-mercaptopyridazine to react with RX', wherein R represents a cyano group, and X' represents a halogen atom such as chlorine or bromine, or with ClCOOR', wherein R' represents an alkyl, benzyl or phenyl group, in the presence of a base such as an alkali metal hydroxide or an alkaline earth metal hydroxide in a solvent such as an alcohol, water, benzene, hexane or a mixture thereof. In the reaction, 3-halo-6-mercaptopyridazine can be replaced with an alkali metal or alkaline earth metal salt thereof.

(c) 3-halo-6-thiocyanopyridazine is also prepared by allowing the corresponding 3,6-dihalopyridazine to react with an alkali metal or ammonium salt of thiocyanic acid in a solvent such as an alcohol, water, an aliphatic ketone or a mixture thereof.

TABLE 1

| Compound | X | R | M.P. (° C.) | Appearance | Solvent of recrystallization |
|---|---|---|---|---|---|
| 3-bromo-6-mercaptopyridazine | Br | H | 140 –145 | Yellow powder | Methanol-H₂O. |
| 3-chloro-6-thiocyanopyridazine | Cl | CN | 123 –124 | Colorless powder | Ethanol-H₂O. |
| 3-bromo-6-thiocyanopyridazine | Br | CN | 113 –115 | Yellow powder | Acetone-H₂O. |
| 3-chloro-6-methoxycarbonylthiopyridazine | Cl | COOCH₃ | 88 – 89 | Colorless needles | Ether-n-hexane. |
| 3-chloro-6-ethoxycarbonylthiopyridazine | Cl | COOC₂H₅ | 49.5– 50.5 | Colorless prisms | n-Hexane. |
| 3-chloro-6-n-propoxycarbonylthiopyridazine | Cl | COO-n-C₃H₇ | 61 – 62 | Yellowish prisms | Do. |
| 3-chloro-6-n-butyloxycarbonylthiopyridazine | Cl | COO-n-C₄H₉ | 29 – 30 | Yellowish plates | Do. |
| 3-chloro-6-n-amyloxycarbonylthiopyridazine | Cl | COO-n-C₅H₁₁ | 32 – 33 | Colorless plates | Do. |
| 3-chloro-6-n-hexyloxycarbonylthiopyridazine | Cl | COO-n-C₆H₁₃ | 45 – 46 | do | Do. |
| 3-chloro-6-n-heptyloxycarbonylthiopyridazine | Cl | COO-n-C₇H₁₅ | 45 – 46 | do | Do. |
| 3-chloro-6-n-octyloxycarbonylthiopyridazine | Cl | COO-n-C₈H₁₇ | 59 – 60 | do | Do. |
| 3-chloro-6-benzyloxycarbonylthiopyridazine | Cl | COOCH₂—⟨phenyl⟩ | 101 –103 | Light yellow needles | Acetone-n-hexane. |
| 3-chloro-6-phenoxycarbonylthiopyridazine | Cl | COO—⟨phenyl⟩ | 122 –124 | Yellowish needles | Do. |

Examples of the preparation of typical compounds of Table 1, which compose the antimicrobial substances of this invention, are shown in the following:

(1) Into a solution of 4.7 parts by weight of potassium hydroxide in 40 parts by volume of methanol is introduced hydrogen sulfide, and then 5 parts by weight of 3,6-dibromopyridazine is added. The mixture is refluxed for 2 hours on a water-bath. The reaction mixture is concentrated under reduced pressure. To the concentrate is added 35 parts by volume of water. After ice-cooling, the mixture is filtered, and the filtrate is acidified with 20% hydrochloric acid under ice-cooling to separate out crystals. The crystals are recrystallized from methanol-water to give 3.2 parts by weight of 3-bromo-6-mercaptopyridazine, which melts at 140–145° C. with decomposition.

Analysis.—Calcd. for $C_4H_3N_2BrS$: N, 14.66. Found: N, 14.87.

(2) To a solution of 1.2 parts by weight of sodium hydroxide and 4.4 parts by weight of 3-chloro-6-mercaptopyridazine in 30 parts by volume of water is added dropwise a solution of 3.5 parts by weight of cyanogen bromide in 15 parts by volume of ethanol with stirring and ice-cooling at 8 to 10° C. Yellowish crystals precipitate immediately. To the reaction mixture is added 10 parts by volume of water, and the crystals are collected by filtration and recrystallized from ethanol-water to give 4.8 parts by weight of 3-chloro-6-thiocyanopyridazine, which melts at 123–124° C. with decomposition.

Analysis.—Calcd. for $C_5H_2N_3SCl$: C, 34.99; H, 1.17; N, 24.48. Found: C, 35.15; H, 1.13; N, 25.00.

(3) To a solution of 0.3 part by weight of sodium hydroxide and 1 part by weight of 3-chloro-6-mercaptopyridazine in 10 parts by volume of water is added dropwise a solution of 0.46 part by weight of cyanogen chloride in 5 parts by volume of ethanol under agitation and ice-cooling. Thereafter the same treatment as in (2) is applied to the reaction mixture to give 0.8 part by weight of 3-chloro-6-thiocyanopyridazine.

(4) A mixture of 10 parts by weight of 3,6-dichloropyridazine, 15 parts by weight of ammonium thiocyanate and 100 parts by volume of 95% ethanol is warmed at 55–65° C. under agitation for 2 hours, and then to the reaction mixture is added 150 parts by volume of water and the mixture is cooled with ice to separate out crystals. The crystals are collected by filtration and recrystallized with active carbon from ethanol-water to give 5 parts by weight of 3-chloro-6-thiocyanopyridazine, which melts at 123–124° C.

*Analysis.*—Calcd. for $C_5H_2N_3SCl$: C, 34.99; H, 1.17; N, 24.48. Found: C, 35.19; H, 1.28; N, 24.72.

(5) A mixture of 10 parts by weight of 3,6-dichloropyridazine, 16 parts by weight of sodium thiocyanate, and 100 parts by volume of 95% ethanol is warmed at 72–80° C. under agitation for 4 hours. Thereafter the same treatment as in (3) is applied to the reaction mixture to give 4 parts by weight of 3-chloro-6-thiocyanopyridazine.

(6) To a solution of 0.4 part by weight of sodium hydroxide and 1.9 parts by weight of 3-bromo-6-mercaptopyridazine in 10 parts by volume of water is added dropwise a solution of 1.1 parts by weight of cyanogen bromide in 5 parts by volume of ethanol under agitation and ice-cooling at 8–9° C. After further agitation for 10 minutes, the precipitated crystals are collected by filtration and recrystallized from acetone-water to give 1.9 parts by weight of 3-bromo-6-thiocyanopyridazine, which melts at 113–115° C. with decomposition.

*Analysis.*—Calcd. for $C_5H_2BrN_3S$: N, 19.40. Found: N, 19.16.

(7) A mixture of 2.4 parts by weight of 3,6-dibromopyridazine, 2.3 parts by weight of ammonium thiocyanate, and 10 parts by volume of 95% ethanol is warmed on a water-bath at 70° C., whereupon a reaction takes place. After cooling, 40 parts by volume of water is added to the reaction mixture to separate out crystals, which are collected by filtration and recrystallized from acetone-water to give 1 part by weight of 3-bromo-6-thiocyanopyridazine, which melts at 110–115° C. with decomposition.

(8) To a solution of 0.3 part by weight of sodium hydroxide and 1 part by weight of 3-chloro-6-mercaptopyridazine in 10 parts by volume of water is added dropwise a solution of 0.8 part by weight of ethyl chlorocarbonate in 2 parts by volume of acetone at room temperature under agitation. After further agitation for about 15 minutes, the precipitated crystals are collected by filtration and recrystallized from n-hexane to give 2.1 parts by weight of 3-chloro-6-ethoxycarbonylthiopyridazine, which melts at 49.5–50.5° C.

*Analysis.*—Calcd. for $C_7H_7O_2N_2ClS$: C, 38.45; H, 3.22; N, 12.81. Found: C, 38.61; H, 3.35; N, 13.01.

(9) Compounds listed in the following Table 2 are prepared in a similar reaction, but replacing ethyl chlorocarbonate used in (8) with the corresponding chlorocarbonates. Properties of the products, i.e. melting points, appearances and solvents for recrystallization are shown in Table 1.

TABLE 2

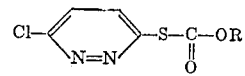

| R | Yield [1] | Formula | C Calcd. | C Found | H Calcd. | H Found | N Calcd. | N Found |
|---|---|---|---|---|---|---|---|---|
| $CH_3$ | 81 | $C_6H_5O_2N_2ClS$ | 35.21 | 35.35 | 2.46 | 2.42 | 13.69 | 13.72 |
| $n\text{-}C_3H_7$ | 75 | $C_8H_9O_2N_2ClS$ | 41.28 | 41.51 | 3.89 | 3.95 | 12.04 | 12.19 |
| $n\text{-}C_4H_9$ | 60 | $C_9H_{11}O_2N_2ClS$ | 43.81 | 44.03 | 4.49 | 4.44 | 11.35 | 11.51 |
| $n\text{-}C_5H_{11}$ | 78 | $C_{10}H_{13}O_2N_2ClS$ | 46.06 | 45.88 | 5.02 | 5.09 | 10.74 | 10.80 |
| $n\text{-}C_6H_{13}$ | 75 | $C_{11}H_{15}O_2N_2ClS$ | 48.07 | 48.42 | 5.50 | 5.62 | 10.19 | 10.13 |
| $n\text{-}C_7H_{15}$ | 70 | $C_{12}H_{17}O_2N_2ClS$ | 49.90 | 50.49 | 5.93 | 6.09 | 9.70 | 9.43 |
| $n\text{-}C_8H_{17}$ | 78 | $C_{13}H_{19}O_2N_2ClS$ | 51.56 | 51.12 | 6.32 | 6.01 | 9.25 | 9.48 |
| $C_6H_5CH_2$ | 68 | $C_{12}H_9O_2N_2ClS$ | 51.34 | 51.42 | 3.23 | 3.19 | 9.97 | 10.08 |
| $C_6H_5$ | 83 | $C_{11}H_7O_2N_2ClS$ | 49.53 | 49.87 | 2.64 | 2.49 | 10.50 | 10.59 |

[1] Yield is shown by weight percentage of the product relative to the starting material 3-chloro-6-mercaptopyridazine.

The above examples merely represent some preferred methods of preparing the active component of the antimicrobial compositions of this invention; however, compounds (I) produced through other methods are also applicable for the purpose of this invention. Other compounds whose preparation is not exemplified above are producible in analogous manner. In this specification, relationship between parts by weight and parts by volume is the same as that between grams and milliliters, and all percentages are in weight percentage, temperatures being all uncorrected.

The antimicrobial activity of compounds (I) is illustrated only with reference to a typical presently-preferred representative thereof, namely 3-chloro-6-thiocyanopyridazine, in the following Table 3, which shows the minimum concentrations of 3-chloro-6-thiocyanopyridazine at which the growth of each microorganism in the table is completely inhibited. The standard agar dilution method was employed for determining the antimicrobial spectrum of 3-chloro-6-thiocyanopyridazine.

TABLE 3

| Microorganism | Incubation period (days) | Temp. (° C.) | Minimum inhibitory concentration (mcg./ml.) |
|---|---|---|---|
| (1) *Saccharomyces cerevisiae* | 2 | 28 | 3.5 |
| (2) *Saccharomyces sake* | 2 | 28 | 2 |
| (3) *Zygosaccharomyces soya* | 3 | 28 | 2 |
| (4) *Hansenula anomala* | 2 | 28 | 2 |
| (5) *Torula rubra* | 2 | 28 | 2 |
| (6) *Candida albicans* | 2 | 37 | 5 |
| (7) *Candida tropicalis* | 2 | 37 | 7.5 |
| (8) *Candida pseudotropicalis* | 2 | 37 | 5 |
| (9) *Candida krusei* | 2 | 37 | 5 |
| (10) *Candida parakrusei* | 2 | 37 | 7.5 |
| (11) *Cryptococcus neoformans* | 2 | 37 | <1 |
| (12) *Trichophyton interdigitale* | 2 | 37 | <1 |
| (13) *Trichophyton mentagrophytes* | 2 | 37 | <1 |
| (14) *Aspergillus niger* | 2 | 28 | 10 |
| (15) *Aspergillus oryzae* | 2 | 28 | 15 |
| (16) *Penicillium chrysogenum* | 2 | 28 | 7 |
| (17) *Penicillium notatum* | 2 | 28 | 5 |
| (18) *Penicillium digitatum* | 2 | 28 | 5 |
| (19) *Penicillium citrinum* | 2 | 28 | 7.5 |
| (20) *Rhizopus nigricans* | 2 | 28 | 15 |
| (21) *Mucor mucedo* | 2 | 28 | 10 |
| (22) *Piricularia oryzae* | 2 | 28 | 7.5 |
| (23) *Gibberella fujikuroi* | 2 | 28 | 2 |
| (24) *Hypochnus sasakii* | 3 | 28 | 2 |
| (25) *Helminthosporium sigmoideum* | 2 | 28 | <1 |
| (26) *Ophiobolus miyabeanus* | 2 | 28 | 5 |
| (27) *Gibberella saubinetii* | 2 | 28 | 2 |
| (28) *Pyrenophora graminae* | 2 | 28 | <1 |
| (29) *Cephalosporium gramineum* | 2 | 28 | 2 |

TABLE 3—Continued

| Microorganism | Incubation period (days) | Temp. (° C.) | Minimum inhibitory concentration (mc.g./ml.) |
|---|---|---|---|
| (30) *Ustilago zeae* | 2 | 28 | 3.5 |
| (31) *Phytophthora infestans* | 2 | 28 | 1 |
| (32) *Macrosporium bataticola* | 2 | 28 | <1 |
| (33) *Ceratostomella fimbriata* | 2 | 28 | 1 |
| (34) *Fusarium oxysporum* f. *niveum* | 2 | 28 | 3.5 |
| (35) *Colletotrichum lagenarium* | 2 | 28 | 20 |
| (36) *Fusarium oxysporum* f. *lycopersici* | 2 | 28 | 7.5 |
| (37) *Phomopsis vexans* | 5 | 28 | <1 |
| (38) *Rhizoctonia solani* | 5 | 28 | 5 |
| (39) *Sclerotinia sclerotiorum* | 5 | 28 | <1 |
| (40) *Botrytis cinerea* | 2 | 28 | 3.5 |
| (41) *Pythium de' Baryanum* | 2 | 28 | 2 |
| (42) *Glomerella cingulata* | 2 | 28 | 20 |
| (43) *Phaeoisariopsis vitis* | 5 | 28 | 1 |
| (44) *Gloeosporium laeticolor* | 3 | 28 | 1.5 |
| (45) *Gloeosporium kaki* | 2 | 28 | 2 |
| (46) *Fusicladium levieri* | 5 | 28 | <1 |
| (47) *Pestalotia diospyri* | 2 | 28 | 5 |
| (48) *Alternaria kikuchiana* | 2 | 28 | 20 |
| (49) *Venturia pirina* | 2 | 28 | 5 |
| (50) *Elsinoë fawcettii* | 5 | 23 | <1 |
| (51) *Diaporthe citri* | 3 | 28 | <1 |
| (52) *Bacillus subtilis* | 1 | 37 | 5 |
| (53) *Bacillus cereus* | 1 | 37 | 5 |
| (54) *Staphylococcus aureus* | 1 | 37 | 5 |
| (55) *Sarcina lutea* | 1 | 37 | 1.5 |
| (56) *Micrococcus flavus* | 1 | 37 | 5 |
| (57) *Escherichia coli* | 1 | 37 | 5 |
| (58) *Proteus vulgaris* | 1 | 37 | 5 |
| (59) *Serratia marcescens* | 1 | 37 | 10 |
| (60) *Pseudomonas tabaci* | 1 | 28 | 2 |
| (61) *Xanthomonas oryzae* | 1 | 28 | <1 |
| (62) *Xanthomonas pruni* | 1 | 28 | 3.5 |
| (63) *Xanthomonas citri* | 1 | 28 | 3.5 |
| (64) *Erwinia carotovora* | 1 | 28 | 10 |

The other compounds falling under compounds (I) have a similar antimicrobial activity against a wide variety of microorganisms.

TABLE 4

| Compound | Microorganism | | | | | | | |
|---|---|---|---|---|---|---|---|---|
| | 6 | 22 | 23 | 30 | 31 | 35 | 42 | 48 |
| 3-chloro-6-mercaptopyridazine | 100 | 50 | 20 | 10 | 35 | 10 | 35 | 35 |
| 3-bromo-6-mercaptopyridazine | 100 | 50 | 50 | 35 | 100 | 75 | 50 | 50 |
| 3-bromo-6-thiocyanopyridazine | 10 | 5 | 10 | 3.5 | 7.5 | 10 | 7.5 | 5 |
| 3-chloro-6-methoxycarbonylthiopyridazine | 200 | 100 | 100 | 50 | 100 | 35 | 50 | 35 |
| 3-chloro-6-ethoxycarbonylthiopyridazine | 100 | 100 | 100 | 50 | 75 | 35 | 50 | 35 |
| 3-chloro-6-n-propoxycarbonylthiopyridazine | 200 | 50 | 100 | 50 | 100 | 50 | 50 | 50 |
| 3-chloro-6-n-butyloxycarbonylthiopyridazine | 500 | 350 | 100 | 50 | 200 | 50 | 100 | 75 |
| 3-chloro-6-n-amyloxycarbonylthiopyridazine | 500 | 200 | 200 | 50 | 200 | 150 | 200 | 150 |
| 3-chloro-6-n-hexyloxycarbonylthiopyridazine | 500 | 100 | 100 | 50 | 100 | 50 | 50 | 50 |
| 3-chloro-6-n-heptyloxycarbonylthiopyridazine | >500 | 50 | 100 | 50 | 100 | 50 | 50 | 75 |
| 3-chloro-6-benzyloxycarbonylthiopyridazine | >500 | 500 | 200 | 35 | 500 | >500 | 150 | 150 |
| 3-chloro-6-phenoxycarbonylthiopyridazine | 200 | >500 | 200 | 50 | >500 | 150 | 200 | 200 |

This is shown, by way of illustration, with respect to additional typical compounds of Formula I and representative microorganisms in Table 4, setting forth the antimicrobial spectra of these compounds. The microorganisms are identified by the numbers employed in Table 3. Agar dilution method was also employed. The figures represent the minimum inhibitory concentration (mcg./ml.) of the compounds. The result shown in Table 4 was obtained after five-day incubation of the microorganisms.

In practice, and for maximum effectiveness, the antimicrobial compositions of the present invention are applied to the plants to be antimicrobially protected or to be treated against spread of microbial disease, in the form of dust, emulsion, suspension or aqueous solution. In other words, the antimicrobial compositions of the invention comprise essentially at least one active compound I and a suitable diluent (or extender and/or conditioning agent) of the type commonly referred to, in connection with the application of agricultural chemicals generally, as a pest control adjuvant. It is not intended, in this respect, that the present invention be limited to any specific proportions of active ingredient(s) I and adjuvant. The compositions may be ready-prepared ab initio or may e.g. be in the form of concentrates comprising a compound I as an active ingredient with adjuvant, e.g. surface active agent, with only a minor amount of the latter present. Such a concentrate is economical as regards transportation, storage and the like, and may easily be admixed—prior to use—with additional adjuvant to give the desired eventual concentration of active ingredient. It is sufficient that an effective quantity of a compound I as an active agent be applied to the plants or parts thereof to be protected or treated, and that the adjuvant be selected on the basis of plant being treated, properties of active ingredient and adjuvant, and the conditions of use.

Thus, if both the active agent and adjuvant(s) are water-soluble, the composition may be applied in the form of an aqueous spray. If, for example, a water-insoluble adjuvant is employed—e.g. if the composition comprises a water-insoluble antimicrobial ingredient—the composition may be applied as an aqueous dispersion. It is also possible, e.g. merely to mix the active agent, in powder form, with a powdered adjuvant, and to use the mixture (dust) as such; or a mixture of pellets may be used. Or the powder mixture may be suspended in water or in an oil which, upon mixing with water, forms e.g. an oil-in-water emulsion containing the active ingredient.

When the new compositions are used in dust form, the adjuvant (or diluent) may e.g. be talc, clay (such as fuller's earth, attapulgite, etc.), diatomaceous earth, lime, calcium sulfate, kaolin and the like. When the compositions are used in the form of liquid, the adjuvant (diluent) is e.g. water, an aqueous solvent, a volatile or non-volatile organic solvent, an oil, etc., the compound—as aforeindicated—taking the form of a solution, emulsion or suspension depending on the nature of the particular materials employed.

The new antimicrobial compositions may contain surface active agents such as wetting and dispersing agents and an emulsifier. They may also contain adherent or sticking agents, and also other pesticides, fungicides, manure or other fertilizer, growth controlling agents, etc., all these additions being considered "adjuvants."

In preparing an antimicrobially active aqueous suspension, it is advantageous to include a surface active agent in sufficient amount to disperse and suspend a compound I as the antimicrobial agent. Examples of such surface active agents are the polyoxyethylene alkylarylethers, such as Triton X–100 (isooctyl phenol etherified with 10 to 11 mols of ethylene oxide), as well as the other "Tritons" (higher molecular weight alkyl phenol polyglycol ethers, e.g. dimeric alkyl phenol polyglycol ethers, the higher molecular weight alkyl radical containing from 8 to 18 carbon atoms); also salts of the alkyl and alkylaryl sulfonates such as Du Pont MP–189 and Nacconol NR, a sodium salt; alkyl sulfates such as Dreft; alkylamide sulfonates, including fatty methyl taurides, such as Igepon T; the fatty acid esters of polyhydric alcohols, such as Span; the ethylene oxide addition products of such esters, as for example Tween, a hexitol product; etc.

It is within the scope and ambit of the present invention to employ other adjuvants than those hereinbefore mentioned—whether as solid diluents, liquid diluents, emulsifiers and/or dispersants, surface active agents or otherwise—those already mentioned being merely illustrative. The essence of the invention does not reside in any specific adjuvant but in a composition consisting essentially of at least one compound I and an appropriate and generally, but not necessarily, inert agricultural adjuvant, and in protecting plant life against fungus diseases or the spread of the latter, by applying to the plants or to portions thereof, such a composition in any suitable or appropriate manner (e.g. by dusting, spraying, etc.) and in an antimicrobially effective amount. The proportions of materials employed in the compositions may vary considerably, as has already been explained. Generally speaking, an antimicrobially effective amount is satisfied by the following quantitative relationships:

Dust compositions for direct application to vegetation may contain from 0.5 percent to 10% or more of the active ingredient(s) I. When the composition is designed as a concentrate for the preparation of sprays or more dilute dusts, the content of active ingredient(s) I may vary from about 10% to as high as 50%, the balance of the composition being one of the diluents and/or surface active agents (adjuvants) previously enumerated. Liquid dispersions of the antimicrobial compositions in water may similarly vary from a very low percentage of active ingredient, e.g. 0.2 to 15%, where the dispersion is to be applied directly to the vegetation, to a relatively high percentage, e.g. 10 to 50%, where the dispersion is to be employed as a concentrate, the balance in each case being constituted by adjuvants.

Organic solvents, useful in compositions according to the invention, include for example non-phytotoxic solvents such as benzene, toluene, xylene and other petroleum distillate fractions or mixtures thereof, as well as the Carbitols and Cellosolves, etc.

Following are a number of examples of presently preferred embodiments of the invention.

*Example 1*

A mixture consisting of 5% of 3-chloro-6-thiocyanopyridazine, 45% of acetone, and 50% of polyoxyethylene-nonylphenylether is diluted about 500-fold with water.

The resultant solution is effective in preventing the blast disease of rice plants when it is sprayed all over the leaves of the plant.

*Example 2*

The same mixture as in Example 1 is diluted 100-fold with water.

In an application of the resultant solution for controlling anthracnose of cucumber, a marked effect is observed in diminishing the occurrences of regions infected by the causal fungus *Colletotrichum lagenarium* Ell. et Halst., to about one-fifteenth in comparison with the control.

*Example 3*

The same solution as in Example 2 is sprayed over the leaves of rice plants. An effect of the treatment for controlling bacterial leaf blight of rice is clearly observed in appearing no more than one-tenth of regions, relative to the control, by the infection of the causal bacterium, *Xanthomonas oryzae* (Uyeda and Ishiyama) Dowson.

*Example 4*

The same mixture as in Example 1 is diluted 400-fold with water.

The solution so diluted is sprayed on pear trees with the purpose of protecting them from black spot. In the trees thus treated, the number of leaves suffering from pear black spot caused by the infection of the fungus, *Alternaria kikuchiana* Tanaka, is one third relative to that observed in the untreated trees as the control.

*Example 5*

Leaves of pear trees which have regions suffering from black spot are sprayed with a solution of the same mixture as in Example 1 in 400-fold water. Seven days after the treatment, expansion of the area of the regions is inhibited to such an extent as less than one-sixth of that in the untreated leaves.

*Example 6*

A mixture consisting of 5% of 3-chloro-6-mercaptopyridazine, 30% of acetone, and 65% of polyoxyethylene-nonylphenylether is diluted 200-fold with water.

The solution thus prepared is sprayed on leaves of pear trees suffering from pear black spot to effectively suppress the expansion of area of the affected regions.

*Example 7*

A mixture consisting of 2% of 3-chloro-6-thiocyanopyridazine and 98% of talc is finely comminuted in a ball mill.

The mixture thus prepared may be applied to sweet potato to protect it from black rot disease.

*Example 8*

A mixture consisting of 20% of 3-chloro-6-mercaptopyridazine, 70% of sodium dinaphthylmethane-disulphonate, and 10% of talc is powdered in the manner described in Example 7.

*Example 9*

A mixture consisting of 5% of 3-chloro-6-ethoxycarbonylthiopyridazine, 45% of acetone, and 50% of polyoxyethylene-nonylphenylether is diluted 100-fold with water.

The solution thus prepared is sprayed on the leaves of cucumber plants. A remarkable effect in controlling anthracnose of cucumber is observed.

*Example 10*

A mixture consisting of 5% of 3-bromo-6-thiocyanopyridazine, 45% of acetone and 50% of polyoxyethylene-nonylphenylether is diluted 100-fold with water.

The resultant solution can be used in place of the aqueous composition employed in Examples 2 and 3, namely, the solution is effective for controlling both cucumber anthracnose and bacterial leaf blight of rice plants.

*Example 11*

A mixture consisting of 5% of 3-bromo-6-mercaptopyridazine, 35% of acetone, and 60% of polyoxyethylene-nonylphenylether is diluted 200-fold with water.

The solution thus prepared is sprayed on leaves of pear trees which are suffering from black spot. It is observed, after seven days, that the treatment is useful to suppress the expansion of regions in the invaded leaves to 16.3% by area relative to that in the untreated leaves.

*Example 12*

A mixture consisting of 2% of 3-bromo-6-thiocyanopyridazine and 98% of talc is finely powdered in the manner described in Example 7.

*Example 13*

A mixture consisting of 20% of 3-bromo-6-mercaptopyridazine, 70% of disodium dinaphthylmethane-disulphonate, and 10% of talc is powdered in the manner described in Example 7.

The powdered product is useful as an antimicrobial concentrate dilutable with water, and the aqueous composition is effective in preventing rice blast.

Having thus disclosed the invention, what is claimed is:

1. An anti-microbial composition for agricultural use and, more especially, adapted to protect a plant from diseases caused by fungi and by bacteria, which consists essentially of anti-microbial agent in the form of a compound of the formula

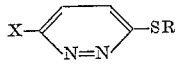

wherein X is a halogen and R is a member selected from the group consisting of hydrogen, cyano and —COOR′, wherein R′ is a member selected from the group consisting of alkyl, benzyl and phenyl, and an agricultural carrier therefor, said anti-microbial agent constituting from 0.2 to 50% of the composition.

2. An anti-microbial composition for agricultural use and, more especially adapted to protect a plant from diseases caused by fungi and by bacteria, which consists essentially of anti-microbial agent in the form of 3-chloro-6-thiocyano-pyridazine, and an agricultural carrier therefor, said anti-microbial agent constituting from 0.2 to 50% of the composition.

3. An anti-microbial composition for agricultural use and, more especially adapted to protect a plant from diseases caused by fungi and by bacteria, which consists essentially of anti-microbal agent in the form of 3-bromo-6-thiocyano-pyridazine, and an agricultural carrier therefor, said anti-microbial agent constituting from 0.2 to 50% of the composition.

4. An anti-microbial composition for agricultural use and, more especially adapted to protect a plant from diseases caused by fungi and by bacteria, which consists essentially of anti-microbial agent in the form of 3-chloro-6-mercapto-pyridazine, and an agricultural carrier therefor, said anti-microbial agent constituting from 0.2 to 50% of the composition.

5. An anti-microbial composition for agricultural use and, more especially adapted to protect a plant from diseases caused by fungi and by bacteria, which consists essentially of anti-microbial agent in the form of 3-bromo-6-mercapto-pyridazine, and an agricultural carrier therefor, said anti-microbial agent constituting from 0.2 to 50% of the composition.

6. An anti-microbial composition for agricultural use and, more especially adapted to protect a plant from diseases caused by fungi and by bacteria, which consists essentially of anti-microbial agent in the form of 3-chloro-6-ethoxycarbonyl-thiopyridazine, and an agricultural carrier therefor, said anti-microbial agent constituting from 0.2 to 50% of the composition.

7. A method of protecting a plant from diseases caused by fungi and by bacteria, which comprises applying to the plant an anti-microbially effective amount of an anti-microbial composition which consists essentially of an anti-microbial agent in the form of a compound of the formula

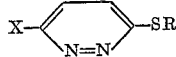

wherein X is a halogen and R is a member selected from the group consisting of hydrogen, cyano and —COOR′, wherein R′ is a member selected from the group consisting of alkyl, benzyl and phenyl, and an agricultural carrier therefor, said anti-microbial agent constituting from 0.2 to 50% of the composition.

8. A method of protecting a plant from diseases caused by Piricularia oryzae Cavara, which comprises applying to the plant a fungicidally effective amount of an anti-microbial composition which consists essentially of anti-microbial agent in the form of a compound of the formula

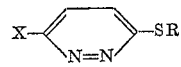

wherein X is a halogen and R is a member selected from the group consisting of hydrogen, cyano and —COOR′, wherein R′ is a member selected from the group consisting of alkyl, benzyl and phenyl, and an agricultural carrier therefor, said anti-microbial agent constituting from 0.2 to 50% of the composition.

9. A method of protecting a plant from diseases caused by Colletotrichum lagenarium Ell. et Halst., which comprises applying to the plant an anti-microbially effective amount of an anti-microbial composition which consists essentially of anti-microbial agent in the form of a compound of the formula

wherein X is a halogen and R is a member selected from the group consisting of hydrogen, cyano and —COOR′, wherein R′ is a member selected from the group consisting of alkyl, benzyl and phenyl, and an agricultural carrier therefor, said anti-microbial agent constituting from 0.2 to 50% of the composition.

10. A method of protecting a plant from diseases caused by Xanthomonas oryzae Dowson, which comprises applying to the plant a bactericidally effective amount of an anti-microbial composition which consists essentially of anti-microbial agent in the form of a compound of the formula

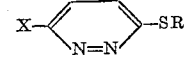

wherein X is a halogen and R is a member selected from the group consisting of hydrogen, cyano and —COOR′, wherein R′ is a member selected from the group consisting of alkyl, benzyl and phenyl, and an agricultural carrier therefor, said anti-microbial agent constituting from 0.2 to 50% of the composition.

11. A method of protecting a plant from diseases caused by Alternaria kikuchiana Tanaka, which comprises applying to the plant a fungicidally effective amount of an anti-microbial composition which consists essentially of anti-microbial agent in the form of a compound of the formula

wherein X is a halogen and R is a member selected from the group consisting of hydrogen, cyano and —COOR′, wherein R′ is a member selected from the group consisting of alkyl, benzyl and phenyl, and an agricultural carrier therefor, said anti-microbial agent constituting from 0.2 to 50% of the composition.

References Cited in the file of this patent

UNITED STATES PATENTS

| 2,764,584 | Druey | Sept. 25, 1956 |
| 2,835,626 | Margot et al. | May 20, 1958 |
| 2,858,311 | Steck | Oct. 28, 1958 |
| 2,861,917 | Kosmin | Nov. 25, 1958 |
| 2,863,802 | Pyne | Dec. 9, 1958 |
| 2,905,672 | Steck | Sept. 22, 1959 |

OTHER REFERENCES

Helv. Chim. Acta, vol. 37, pages 121–133, particularly page 126 (1954).